United States Patent [19]

Vrotacoe

[11] Patent Number: 5,245,923
[45] Date of Patent: Sep. 21, 1993

[54] PRINTING PRESS WITH MOVABLE PRINTING BLANKET

[75] Inventor: James B. Vrotacoe, Rochester, N.H.
[73] Assignee: Heidelberg Harris Inc., Dover, N.H.
[21] Appl. No.: 909,729
[22] Filed: Jul. 7, 1992
[51] Int. Cl.$^5$ .................................. B41F 7/02
[52] U.S. Cl. .................. 101/217; 101/375; 428/909; 492/18
[58] Field of Search .......... 101/217, 375, 376, 378, 101/415.1, 475, 492; 428/909; 492/16, 18

[56] References Cited

U.S. PATENT DOCUMENTS

| | | | |
|---|---|---|---|
| 3,146,709 | 9/1964 | Bass et al. | 101/375 |
| 3,881,045 | 4/1975 | Strunk | 101/401.1 |
| 4,174,244 | 11/1979 | Thomas et al. | 428/909 |
| 4,913,048 | 4/1990 | Tittgemeyer | 101/375 |
| 4,932,324 | 6/1990 | Pinkston et al. | 101/486 |
| 4,953,461 | 9/1990 | Gaffney et al. | 101/492 |

Primary Examiner—Edgar S. Burr
Assistant Examiner—Stephen R. Funk
Attorney, Agent, or Firm—Tarolli, Sundheim & Covell

[57] ABSTRACT

An offset printing unit (10) for printing an inked image on sheet material (30) comprises a rotatable plate cylinder (12) and a rotatable blanket cylinder (14). The plate cylinder (12) supports a printing plate (18) which defines the inked image. A tubular printing blanket (20) is received telescopically over the blanket cylinder (14). The printing unit (10) further comprises a frame (16) and a motor (26). The frame (16) supports the plate cylinder (12) and the blanket cylinder (14) in positions for the printing plate (18) to transfer the inked image onto the tubular printing blanket (20) at a nip (28) between the cylinders (12, 14) when the cylinders (12, 14) are rotating. The motor (26) rotates the plate cylinder (12) and the blanket cylinder (14) to transfer the inked image to the tubular printing blanket (20). The tubular printing blanket (20) is supported on the blanket cylinder (14) to rotate relative to the blanket cylinder (14) when the cylinders (12, 14) are being rotated by the motor (26) in a printing operation.

11 Claims, 2 Drawing Sheets

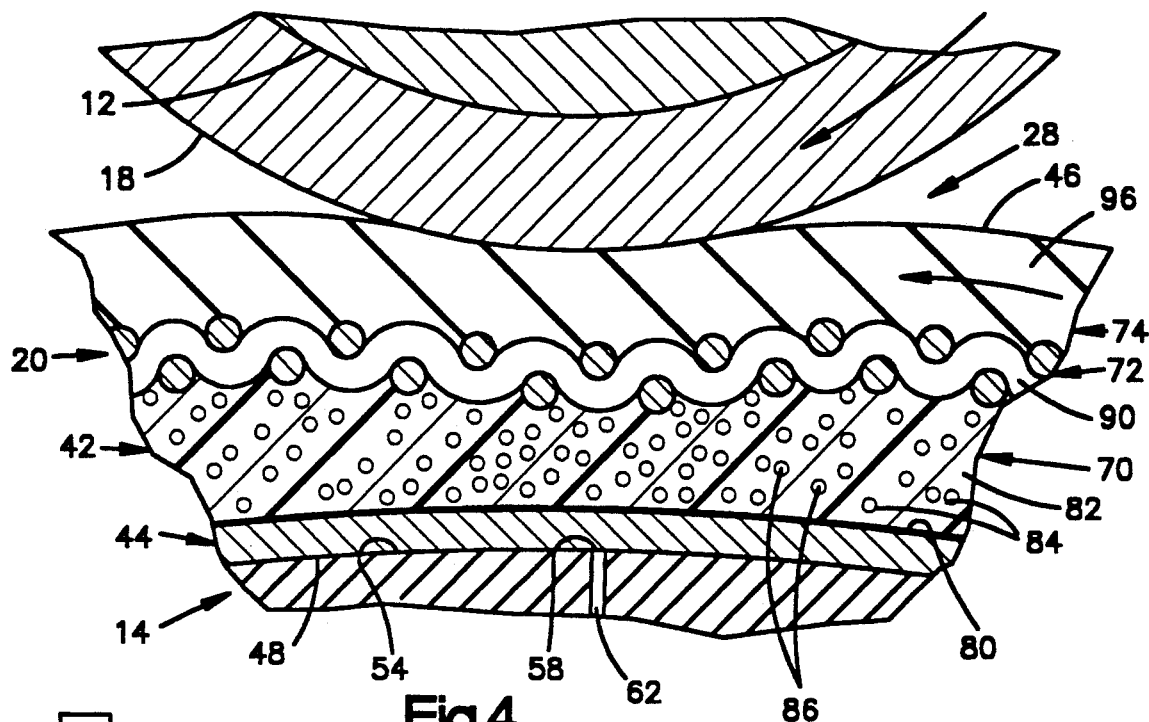
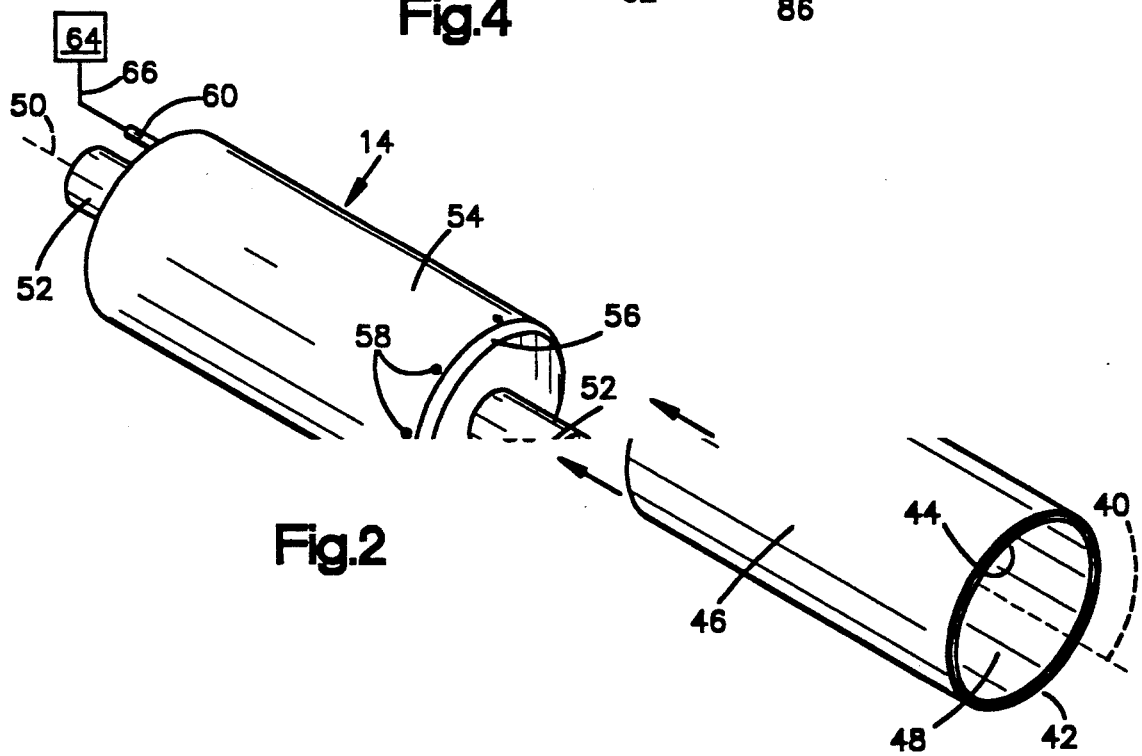

PRINTING PRESS WITH MOVABLE PRINTING BLANKET

FIELD OF THE INVENTION

The present invention relates to an offset printing unit.

BACKGROUND OF THE INVENTION

An offset printing unit has a plurality of rotatable cylinders, including a plate cylinder and a blanket cylinder. The plate cylinder carries a printing plate having a surface on which an inked image is defined. The blanket cylinder carries a printing blanket. The plate on the plate cylinder transfers the inked image to the blanket on the blanket cylinder at a nip between the plate cylinder and the blanket cylinder when the cylinders rotate. The blanket on the blanket cylinder subsequently transfers the inked image to the material being printed, such as a web of paper.

The printing plate transfers the inked image to the blanket upon each revolution of the plate cylinder and the blanket cylinder. A small amount of ink can remain on the surface of the blanket after the inked image is transferred from the blanket to the material being printed. If the printing plate transfers the inked image to the same location on the surface of the blanket upon each revolution of the cylinders, such small amounts of ink can build up at that location and can mar the printed image.

SUMMARY OF THE INVENTION

In accordance with the present invention, an offset printing unit for printing an inked image on sheet material comprises a rotatable plate cylinder and a rotatable blanket cylinder. The plate cylinder has a means for supporting a printing plate which defines the inked image. A tubular printing blanket is received telescopically over the blanket cylinder.

The printing unit further comprises a frame means and a motor means. The frame means supports the plate cylinder and the blanket cylinder in positions for a printing plate on the plate cylinder to transfer the inked image to the tubular blanket on the blanket cylinder at a nip between the cylinders when the cylinders rotate. The motor means rotates the plate cylinder and the blanket cylinder to transfer the inked image to the tubular blanket. The tubular blanket is supported on the blanket cylinder to rotate relative to the blanket cylinder when the cylinders are being rotated by the motor means in a printing operation.

A printing unit constructed in accordance with the present invention minimizes the buildup of ink on the surface of the blanket. The blanket is tubular, and is supported to rotate relative to the blanket cylinder during a printing operation. Rotation of the blanket relative to the blanket cylinder causes a gradual change in the surface portion of the blanket which moves through the nip when the inked image on the printing plate moves through the nip. The location on the surface of the blanket where the printing plate transfers the inked image to the blanket therefore changes gradually during a printing operation. The printing unit thus avoids a buildup of ink which might otherwise occur if the inked image were transferred repeatedly to the same location on the surface of the blanket.

BRIEF DESCRIPTION OF THE DRAWINGS

The foregoing and other features of the present invention will become apparent to those skilled in the art upon a consideration of the following description of the invention with reference to the accompanying drawings, wherein:

FIG. 2 is a schematic view of parts shown in FIG. 1;

FIG. 4 also is a partial sectional view of parts shown in FIG. 1; and

DESCRIPTION OF A PREFERRED EMBODIMENT

Figure 1:
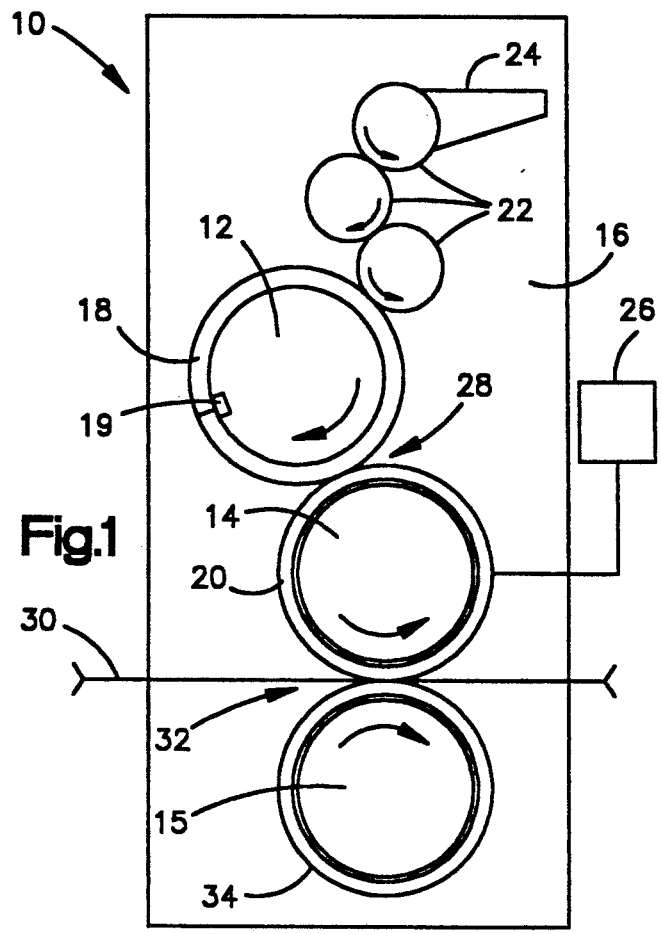
FIG. 1 is a schematic view of a printing unit constructed in accordance with the present invention.

A printing unit 10 constructed in accordance with the present invention is shown schematically in FIG. 1. The printing unit 10, by way of example, is an offset lithographic printing unit including a plate cylinder 12, a blanket cylinder 14 and an impression cylinder 15. The plate cylinder 12, the blanket cylinder 14 and the impression cylinder 15 are supported for rotation at their opposite ends in a pair of side frames 16, one of which is shown in FIG. 1.

The plate cylinder 12 carries a printing plate 18 which defines an image to be printed. The printing plate 18 is formed as a thin metal sheet, and is mounted on the plate cylinder 12 by wrapping the sheet around the plate cylinder 12. A locking mechanism 19 in the plate cylinder 12 holds the printing plate 18 securely on the plate cylinder 12, as is known. The blanket cylinder 14 carries a printing blanket 20. The blanket 20 is formed as a tube which is mounted on the blanket cylinder 14 by sliding the tube telescopically over the blanket cylinder 14.

The printing unit 10 also includes inker rolls 22, an ink fountain 24 and a motor 26. The motor 26 drives a gear train (not shown) which is connected to the cylinders and rolls in the printing unit 10 to rotate the cylinders and rolls as indicated by the arrows shown in FIG. 1. The motor 26 and the gear train can be constructed as known in the art.

When the cylinders and rolls are being rotated by the motor 26 and the gear train, the inker rolls 22 transfer ink from the ink fountain 24 to the printing plate 18 on the plate cylinder 12. The printing plate 18 transfers the inked image to the blanket 20 on the blanket cylinder 14 at the nip 28 between the plate cylinder 12 and the blanket cylinder 14. The blanket 20 subsequently transfers the inked image to the material being printed, which is preferably a web 30 moving through the nip 32 between the blanket cylinder 14 and the impression cylinder 15. As shown in FIG. 1, the impression cylinder 15 is a second blanket cylinder carrying a second tubular printing blanket 34 for printing simultaneously on the opposite side of the web 30.

As shown schematically in FIG. 2, the blanket 20 has a central axis 40, a printing portion 42 and a supporting sleeve 44. The printing portion 42 is flexible, and has a cylindrical shape with a gapless cylindrical outer printing surface 46. The sleeve 44 is relatively rigid, and has a gapless cylindrical inner mounting surface 48. In the preferred embodiment of the invention, the sleeve 44 is made of nickel.

Also shown schematically in FIG. 2 is the blanket cylinder 14. The blanket cylinder 14 has a central axis 50, and a pair of stub shafts 52 for supporting the blanket cylinder 14 to rotate about the axis 50 in the printing unit 10. The blanket cylinder 14 also has a cylindrical outer surface 54 and a chamfered edge surface 56 at one axial end of the outer surface 54. The outer surface 54 of the blanket cylinder 14 has a diameter which is slightly greater than the inside diameter of the sleeve 44 in the blanket 20. The chamfered edge surface 56 of the blanket cylinder 14 slopes radially inward from the outer surface 54, and has a diameter at its radially inner end which is slightly less than the inside diameter of the sleeve 44.

The blanket cylinder 14 further has a plurality of air flow openings 58 at the outer surface 54. The air flow openings 58 are arranged in a circumferential array closely spaced from the chamfered edge surface 56, and communicate with an air flow inlet 60 through a plurality of air flow passages 62 (FIGS. 3, 4) within the blanket cylinder 14. The air flow inlet 60 selectively communicates with a source 64 of pneumatic pressure through a pneumatic line 66.

As indicated by the arrows shown in FIG. 2, the blanket 20 is receivable telescopically over the blanket cylinder 14. Because the outer surface 54 of the blanket cylinder 14 has a diameter which is slightly greater than the inside diameter of the sleeve 44 in the blanket 20, the sleeve 44 is forced to expand diametrically when it is moved against the chamfered edge surface 56 in a direction axially toward the cylindrical outer surface 54. When the inner surface 48 of the sleeve 44 is moved axially over the air flow openings 58 at the outer surface 54 of the blanket cylinder 14, pneumatic pressure is directed from the source 64 to the air flow openings 58. Pressurized air then flows radially outward from the openings 58 and impinges against the inner surface 48 of the sleeve 44 to further expand the sleeve 44 diametrically.

The pneumatic pressure directed against the inner surface 48 of the sleeve 44 expands the sleeve 44 continuously as the sleeve 44 is moved axially over the outer surface 54 of the blanket cylinder 14. When the blanket 20 is moved axially into its installed position on the blanket cylinder 14, the pneumatic pressure is relieved. The sleeve 44 in the blanket 20 then elastically contracts diametrically against the outer surface 54 of the blanket cylinder 14. The blanket 20, which has an initial inside diameter less than the diameter of the outer surface 54 of the blanket cylinder 14, is thus installed on the blanket cylinder 14 with an interference fit.

The blanket 20 is subsequently removed from the blanket cylinder 14 by again expanding the sleeve 44 diametrically under the influence of pneumatic pressure, and by sliding the blanket 20 axially off of the blanket cylinder 14 when the blanket 20 is in its expanded condition. The nickel material of the sleeve 44 has the optimum elasticity for installing and removing the blanket 20 in the foregoing manner when subjected to standard shop air pressure of 90 psi.

Figure 3:
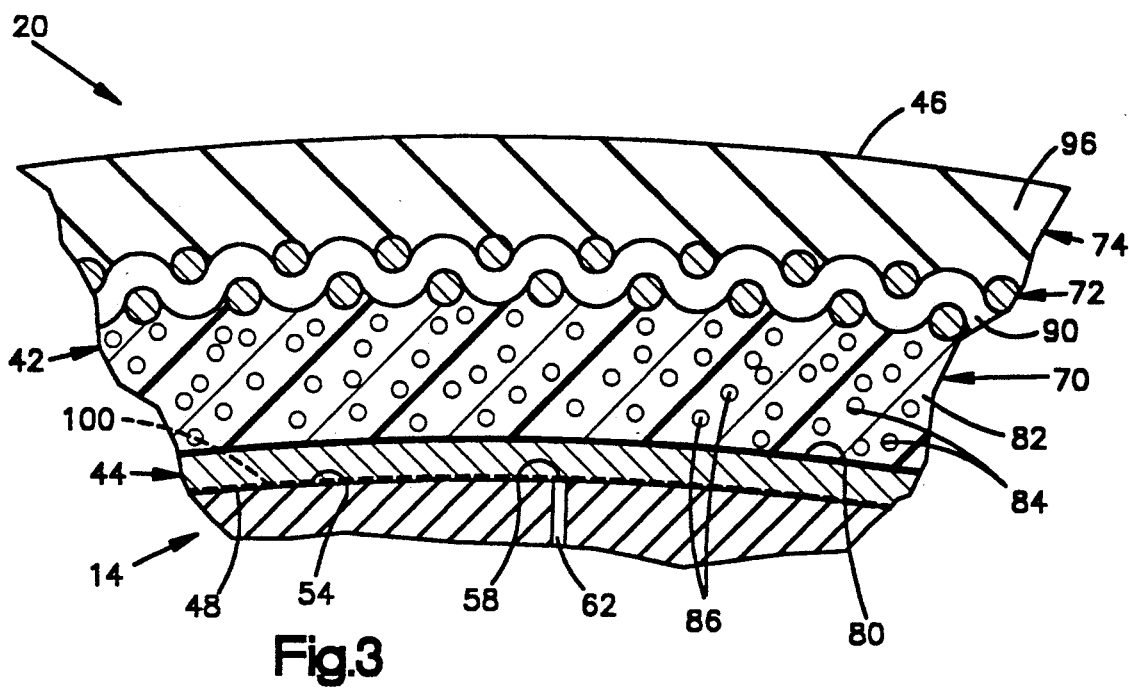
FIG. 3 is a partial sectional view of parts shown in FIG. 1.

As shown partially in FIG. 3, the inner surface 48 of the blanket 20 is pressed in frictional contact with the outer surface 54 of the blanket cylinder 14 uniformly about its circumference when the blanket 20 is installed with an interference fit as described above. As further shown in FIG. 3, the printing portion 42 of the blanket 20 is formed in layers. In the embodiment of the invention shown in the drawings, the printing portion 42 includes layers similar to the layers of the printing blanket shown in U.S. Pat. No. 3,700,541 to Shrimpton et al. The printing portion 42 thus includes a compressible layer 70, a strengthening layer 72 and a printing layer 74.

The compressible layer 70 in the printing portion 42 of the blanket 20 is fixed to the sleeve 44 by an adhesive bond 80, and comprises a body 82 of elastomeric material. The body 82 of elastomeric material has uniformly distributed microcells 84 which impart compressibility to the body 82. The microcells 84 are produced by the incorporation of compressible hollow microspheres 86 in the elastomeric material of the body 82. The body 82 of elastomeric material could also be rendered compressible by the incorporation of material other than the microspheres 86, such as pieces of compressible thread as shown in U.S. Pat. No. 3,887,750 to Duckett et al. Alternatively, the body 82 could be rendered compressible by known methods of producing voids, such as by blowing and leaching as shown in U.S. Pat. No. 4,025,685 to Haran et al.

The strengthening layer 72 in the printing portion 42 of the blanket 20 is formed of a fabric 90 bonded with a polymer composition. The printing layer 74 is formed of a body 96 of elastomeric material, and defines the outer printing surface 46 of the blanket 20. Unlike the printing layer shown in the patent to Shrimpton, et al., the printing layer 74 is cylindrical, and the outer printing surface 46 is a continuous, gapless cylindrical surface extending circumferentially entirely around the blanket 20.

When the rolls and cylinders in the printing unit 10 rotate under the influence of the motor 26 as shown in FIG. 1, the printing plate 18 on the plate cylinder 12 moves against the blanket 20 on the blanket cylinder 14 at the nip 28 between the plate cylinder 12 and the blanket cylinder 14. As shown in FIG. 4, the blanket 20 is indented where the printing plate 18 presses against it at the nip 28. The compressible layer 70 in the blanket 20 becomes compressed beneath the indented portions of the printing layer 74 and the strengthening layer 72. The compressible layer 70 thus allows radially inward displacement of the printing layer 74 and the strengthening layer 72 so that the printing surface 46 on the printing layer 74 will not bulge radially outward on opposite sides of the nip 28. If the printing surface 46 were to bulge radially outward in addition to being indented radially inward as shown in FIG. 4, such deformation of the printing surface 46 could smear the inked image being transferred from the printing plate 18 to the blanket 20, as is known in the art.

As viewed in FIGS. 1 and 4, the plate cylinder 12 rotates in a clockwise direction and the blanket cylinder 14 rotates in a counterclockwise direction. The plate cylinder 12 and the blanket cylinder 14 are rotated at equal rates of revolutions per minute. The printing plate 18 is rigidly mounted on the plate cylinder 12, and therefore rotates at the same rate as the plate cylinder 12. However, the blanket 20 is not rigidly mounted on the blanket cylinder 14. Instead, the blanket 20 is mounted on the blanket cylinder 14 by an interference fit between the inner surface 48 of the blanket 20 and the outer surface 54 of the blanket cylinder 14. The radial tightness of the interference fit establishes a normal force between the inner and outer surfaces 48 and 54. This results in a frictional force which resists movement of the inner and outer surfaces 48 and 54 relative to each other. The frictional force is equal to the product of the normal force and the coefficient of friction between those surfaces. The inner surface 48 can move circumferentially in sliding contact with the outer surface 54 when subjected to a force which is sufficient to overcome the frictional force resisting movement between those surfaces.

Figure 5:
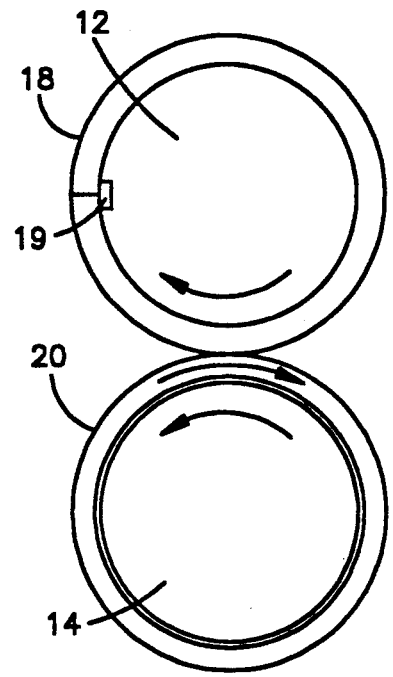
FIG. 5 is a schematic view of parts shown in FIG. 1.

As described above with reference to FIG. 4, the printing plate 18 presses against the blanket 20 at the nip 28. The printing plate 18 thus exerts a force against the blanket 20 at the nip 28. The other blanket 34 on the impression cylinder 15 similarly presses against the blanket 20 at the nip 32 (FIG. 1). The other blanket 34 thus exerts a force against the blanket 20 at the nip 32. The frictional force resisting movement between the inner surface 48 of the blanket 20 and the outer surface 54 of the blanket cylinder 14 is designed so that the forces exerted against the blanket 20 by the printing plate 18 and the other blanket 34 are sufficient to overcome the frictional resistance to movement between those surfaces. The forces exerted against the blanket 20 by the printing plate 18 and the other blanket 34 are thus sufficient to cause the inner surface 48 to move circumferentially in sliding contact with the outer surface 54 during a printing operation. Such forces urge the blanket 20 to slow down relative to the blanket cylinder 14, and thus cause the blanket 20 to move relative to the blanket cylinder 14 in the direction indicated by the arrow pointing to the right in FIG. 5, i.e., in a direction opposite to the direction of rotation of the blanket cylinder 14. The blanket 20 therefore rotates at a rate of revolutions per minute which is slightly less than the rate of the blanket cylinder 14, the plate cylinder 12 and the printing plate 18.

The difference in surface speeds between the blanket 20 and the printing plate 18 is slight because the blanket 20 preferably moves relative to the blanket cylinder 14 only in a slight creeping motion. In the preferred embodiment of the invention shown in the drawings, the sleeve 44 in the blanket 20 has a thickness of 0.005 inches, and the inner surface 48 of the sleeve 44 has an inside diameter of 6.5460 inches when the blanket 20 is not installed on the blanket cylinder 14. The outer surface 54 of the blanket cylinder 14 has a diameter of 6.5545 inches. The blanket 20 and the blanket cylinder 14 thus have an initial diametral interference of 0.0085 inches. When the blanket 20 is installed on the blanket cylinder 14, this initial diametral interference, along with the coefficient of friction between the blanket 20 and the blanket cylinder 14, establishes a frictional force resisting movement between the surfaces 48 and 54. That frictional force is exceeded by the forces exerted against the blanket 20 at the nips 28 and 32 to the extent that the blanket 20 will move circumferentially relative to the blanket cylinder 14 in an amount between one and two inches upon each 100,000 revolutions of the blanket cylinder 14 during a printing operation. The blanket 20 would thus move between one and two inches per hour when the printing unit 10 operates at a press speed of 3,000 feet per minute, and would move a total of approximately eight inches in an eight hour shift. If the blanket 20 is moved eight inches circumferentially around the blanket cylinder 14 in an eight hour shift, the location on the blanket 20 where the inked image is transferred to the printing surface 46 will likewise be moved eight inches circumferentially around the printing surface 46. This gradual change in the location where the inked image is transferred to the printing surface 46 avoids the buildup of ink on the printing surface 46. Such a buildup of ink might otherwise occur if the inked image were transferred repeatedly to the same location on the printing surface 46 throughout the entire printing operation.

The frictional force resisting movement of the blanket 20 relative to the blanket cylinder 14 can be adjusted to control the amount that the blanket 20 moves relative to the blanket cylinder 14. The frictional force can be adjusted by changing the normal force and by changing the coefficient of friction between the blanket 20 and the cylinder 14. The normal force can be changed by changing the initial diametral interference. The coefficient of friction can be changed by changing the texture of the surfaces 48 and/or 54 such as by polishing, grinding, etc. The coefficient of friction can also be varied with the use of a frictional or lubricating material between the surfaces 48 and 54. For example, as shown schematically in dashed lines in FIG. 3, a coating 100 having a predetermined coefficient of friction can be applied to either or both of the surfaces 48 and 54.

From the above description of the invention, those skilled in the art will perceive improvements, changes and modifications. Such improvements, changes and modifications within the skill of the art are intended to be covered by the appended claims.

Having described the invention, the following is claimed:

1. An offset printing unit (10) for printing an image, said printing unit (10) comprising:
    a rotatable plate cylinder (12);
    a printing plate (18) supported on said plate cylinder (12), said printing plate (18) defining the image;
    a rotatable blanket cylinder (14);
    a tubular printing blanket (20) received telescopically over said blanket cylinder (14);
    motor means (26) for rotating said plate cylinder (12) and said blanket cylinder (14) continuously throughout a printing operation including a plurality of revolutions of said cylinders (12, 14); and
    frame means (16) for supporting said cylinders (12, 14) in printing positions in which said printing plate (18) transfers an inked image onto said tubular printing blanket (20) and simultaneously applies a force against said tubular printing blanket (20) at a nip (28) between said cylinders (12, 14) when said cylinders (12, 14) are being rotated by said motor means (26);
    means for allowing said tubular printing blanket (20) to rotate relative to said blanket cylinder (14) entirely about the circumference of said tubular printing blanket (20) under the influence of said force throughout said plurality of revolutions of said cylinders (12, 14).

2. An offset printing unit (10) as defined in claim 1 wherein said blanket cylinder (14) has an outer mounting surface (54), said tubular printing blanket (20) comprising a cylindrical printing portion (42) and a cylindrical sleeve (44), said printing portion (42) having a continuous gapless cylindrical outer printing surface (46), said sleeve (44) supporting said printing portion (42) in a cylindrical shape and having a cylindrical inner mounting surface (48) frictionally engaged with said outer mounting surface (54), said inner mounting surface (48) being rotatable in sliding contact with said outer mounting surface (54) entirely about the circumference of said inner mounting surface (48) under the influence of said force throughout said plurality of revolutions of said cylinders (12, 14).

3. An offset printing unit (10) as defined in claim 2 further comprising a rotatable impression cylinder (15), said impression cylinder (15) being supportable by said frame means (16) in a printing position in which a surface on said impression cylinder (15) applies a force against said tubular printing blanket (20) at a nip (32) between said impression cylinder (15) and said blanket cylinder (14), said tubular printing blanket (20) being supported to rotate relative to said blanket cylinder (14) entirely about the circumference of said tubular printing blanket (20) under the influence of said forces applied at said nips (28, 32).

4. An offset printing unit (10) as defined in claim 3 wherein said motor means (26) rotates said blanket cylinder (14) in a first direction about the axis of said blanket cylinder (14), said tubular printing blanket (20) being supported on said blanket cylinder (14) to rotate relative to said blanket cylinder (14) entirely about the circumference to said tubular printing blanket (20) in a second direction opposite to said first direction under the influence of said forces applied at said nips (28, 32).

5. An offset printing apparatus as defined in claim 3 further comprising friction controlling means for causing said frictional engagement of said inner mounting surface (48) with said outer mounting surface (54) to enable said tubular printing blanket (20) to rotate relative to said blanket cylinder (14) entirely about the circumference of said tubular printing blanket (20) so as to become circumferentially shifted a predetermined distance around the circumference of said blanket cylinder (14) throughout a predetermined number of said plurality of revolutions of said cylinders (12, 14) under the influence of said forces, said friction controlling means determining the frictional resistance to rotation of said inner mounting surface (48) in sliding contact with said outer mounting surface (54).

6. An offset printing apparatus (10) as defined in claim 5 wherein said friction controlling means defines a predetermined initial diametrical interference between said inner mounting surface (48) and said outer mounting surface (54).

7. An offset printing apparatus (10) as defined in claim 5 wherein said friction controlling means comprises a surface texture where said inner mounting surface (48) is frictionally engaged with said outer mounting surface (54).

8. An offset printing apparatus (10) as defined in claim 5 wherein said friction controlling means comprises a material (100) located between said inner and outer mounting surfaces (48, 54), said material (100) having a predetermined coefficient of friction.

9. A method of printing including providing an offset printing unit (10), the printing unit (10) having a rotatable plate cylinder (12) carrying a printing plate (18) which defines an image, a rotatable blanket cylinder (14), a tubular printing blanket (20) received telescopically over the blanket cylinder (14), motor means (26) for rotating the plate cylinder (12) and the blanket cylinder (14) continuously throughout a printing operation including a plurality of revolutions of the cylinders (12, 14) and frame means (16) for supporting the plate cylinder (12) and the blanket cylinder (14) in printing positions in which the printing plate (18) on the plate cylinder (12) transfers the inked image onto the tubular printing blanket (20) on the blanket cylinder (14) and simultaneously applies a force against the tubular printing blanket (20) at a nip (28) between the cylinders (12, 14) when the cylinders (12, 14) are being rotated by the motor means (26), and rotating said tubular printing blanket (20) relative to said blanket cylinder (14) entirely about the circumference of said tubular printing blanket (20) throughout said plurality of revolutions of said plate cylinder (12) and said blanket cylinder (14).

10. A method as defined in claim 9 wherein said plate cylinder (12) and said blanket cylinder (14) are rotated by said motor means (26) at equal rates of revolutions per minute, and said tubular printing blanket (20) is rotated relative to said blanket cylinder (14) entirely about the circumference of said tubular printing blanket (20) when said plate cylinder (12) and said blanket cylinder (14) are being rotated at said equal rates.

11. A method as defined in claim 9 wherein said tubular printing blanket (20) is rotated relative to said blanket cylinder (14) entirely about the circumference of said tubular printing blanket (20) so as to become circumferentially shifted a predetermined distance around the circumference of said blanket cylinder (14) throughout a predetermined number of said plurality of revolutions of said cylinders (12, 14).

* * * * *

UNITED STATES PATENT AND TRADEMARK OFFICE
CERTIFICATE OF CORRECTION

PATENT NO. : 5,245,923
DATED : September 21, 1993
INVENTOR(S) : James B. Vrotacoe It is certified that error appears in the above-indentified patent and that said Letters Patent is hereby corrected as shown below:

Column 7, line 19, change "to" to --of--.

Signed and Sealed this

Twelfth Day of April, 1994

Attest:

BRUCE LEHMAN

*Attesting Officer*     *Commissioner of Patents and Trademarks*